United States Patent
Carter et al.

(10) Patent No.: US 9,514,119 B2
(45) Date of Patent: Dec. 6, 2016

(54) CONTRIBUTOR IDENTIFICATION TOOL

(71) Applicant: International Business Machines Corporation, Armonk, NY (US)

(72) Inventors: Bernadette A. Carter, Cary, NC (US); Kathryn Lemanski Mercer, Raleigh, NC (US); Cesar A. Wong, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/899,352

(22) Filed: May 21, 2013

(65) Prior Publication Data

US 2014/0351275 A1 Nov. 27, 2014

(51) Int. Cl.
*G06F 7/00* (2006.01)
*G06F 17/30* (2006.01)
*G06F 17/27* (2006.01)

(52) U.S. Cl.
CPC .................. *G06F 17/2705* (2013.01)

(58) Field of Classification Search
None
See application file for complete search history.

(56) References Cited

U.S. PATENT DOCUMENTS

| | | | | |
|---|---|---|---|---|
| 7,716,217 B2 * | 5/2010 | Marston et al. | | 707/728 |
| 7,814,327 B2 * | 10/2010 | Ahuja | | G06F 21/606 709/224 |
| 8,126,888 B2 * | 2/2012 | Herlocker et al. | | 707/732 |
| 8,135,711 B2 * | 3/2012 | Charnock | | G06F 17/30722 707/728 |
| 8,176,049 B2 * | 5/2012 | Deninger | | G06F 17/30722 707/736 |
| 8,189,746 B1 * | 5/2012 | Thenthiruperai et al. | | 379/88.04 |
| 8,244,731 B2 * | 8/2012 | Xu | | 707/737 |
| 8,554,770 B2 * | 10/2013 | Purdy | | 707/736 |
| 8,560,534 B2 * | 10/2013 | Lowe | | H04L 63/123 707/728 |
| 8,577,888 B2 * | 11/2013 | Portilla | | 707/738 |
| 8,661,001 B2 * | 2/2014 | Eliashberg | | G06Q 30/06 707/694 |
| 2007/0250901 A1 * | 10/2007 | McIntire | | H04N 7/17318 725/146 |
| 2008/0082904 A1 * | 4/2008 | Martinez | | G06F 17/3089 715/205 |
| 2008/0086695 A1 * | 4/2008 | Oral | | 715/752 |
| 2008/0141117 A1 * | 6/2008 | King | | G06F 17/30011 715/238 |
| 2008/0195456 A1 * | 8/2008 | Fitzpatrick | | G06F 17/30867 705/7.15 |
| 2008/0222295 A1 * | 9/2008 | Robinson | | G06F 17/30867 709/227 |

(Continued)

*Primary Examiner* — Hexing Liu
(74) *Attorney, Agent, or Firm* — DeLizio Law, PLLC

(57) ABSTRACT

An electronic document is parsed against a plurality of phrases. Each of the plurality of phrases indicates a text effect. It is determined that the electronic document includes a phrase at least similar to a first phrase of the plurality of phrases. A first contributor of the electronic document that is associated with the phrase is determined. A first text effect indicated by the phrase is determined. A mapping is created between the first contributor and the first text effect indicated by the phrase. The mapping is supplied for presenting of the electronic document.

11 Claims, 5 Drawing Sheets

(56) References Cited

U.S. PATENT DOCUMENTS

| | | | |
|---|---|---|---|
| 2009/0248672 A1* | 10/2009 | McIntire | G06F 17/3002 |
| 2009/0299824 A1* | 12/2009 | Barnes, Jr. | G06F 3/04847 |
| | | | 705/7.39 |
| 2009/0319617 A1* | 12/2009 | Bhakar et al. | 709/206 |
| 2010/0030798 A1* | 2/2010 | Kumar et al. | 707/102 |
| 2010/0131523 A1* | 5/2010 | Yu et al. | 707/756 |
| 2011/0010665 A1 | 1/2011 | DeLuca | |
| 2011/0035289 A1* | 2/2011 | King | G06Q 30/02 |
| | | | 705/14.73 |
| 2011/0202531 A1* | 8/2011 | Zuckerberg et al. | 707/737 |
| 2012/0005209 A1* | 1/2012 | Rinearson | G06F 17/30908 |
| | | | 707/737 |
| 2012/0330981 A1* | 12/2012 | Madnani | 707/754 |
| 2013/0124543 A1* | 5/2013 | Boss et al. | 707/754 |
| 2013/0198196 A1* | 8/2013 | Myslinski | G06F 17/30023 |
| | | | 707/740 |
| 2014/0075004 A1* | 3/2014 | Van Dusen | H04L 41/04 |
| | | | 709/223 |
| 2014/0095509 A1* | 4/2014 | Patton | G06F 17/30241 |
| | | | 707/740 |
| 2014/0236953 A1* | 8/2014 | Rapaport | G06Q 10/10 |
| | | | 707/740 |
| 2014/0304579 A1* | 10/2014 | Foster et al. | 715/205 |
| 2014/0337335 A1* | 11/2014 | Gordon | H04N 21/2665 |
| | | | 707/736 |

\* cited by examiner

CONTRIBUTOR IDENTIFICATION TOOL

BACKGROUND

Embodiments of the inventive subject matter generally relate to the field of data processing, and more particularly to recognizing text distinguished based on contributor in a multi-contributor document.

Oftentimes, multiple people contribute to a document, such as an article, email, etc. For example, one person may send an email to a second person containing questions for the second person to answer. The second person, in responding to the questions included in the email, may add comments or inline text in the original email. The second person may alter the appearance of his/her text (e.g., font color, typeface, font weight, etc.) to make their added text easily distinguishable from the surrounding text in the document. For example, the second person may write at the beginning of the email "see my comments in red," then proceed to add comments or inline text in the email with a red color.

SUMMARY

An electronic document is parsed against a plurality of phrases. Each of the plurality of phrases indicates a text effect. It is determined that the electronic document includes a phrase at least similar to a first phrase of the plurality of phrases. A first contributor of the electronic document that is associated with the phrase is determined. A first text effect indicated by the phrase is determined. A mapping is created between the first contributor and the first text effect indicated by the phrase. The mapping is supplied for presenting of the electronic document.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to using text effects to distinguish text, text can also be distinguished with markers or delimiters. In other instances, well-known instruction instances, protocols, structures and techniques have not been shown in detail in order not to obfuscate the description.

This description will sometimes refer to a document having text from multiple contributors as a multi-contributor document. When multiple people contribute text to a document (e.g., e-mail message, word processing document, etc.), each person can manipulate the appearance of his/her contributed text differently in order to distinguish his/her contributed text from other text in the document. This can lead to challenges for visually impaired persons utilizing assisting devices/software (e.g., screen readers). For those without visual impairments, reading the document can also be difficult when numerous contributors manipulate the appearance of their text. A tool can be developed (e.g., an extension to an application, a stand-alone document analysis tool, a browser plug-in, a widget, etc.) that analyzes a document having text from multiple contributors to determine whether at least some of the text has been distinguished to signify a particular contributor. A contributor typically indicates how his/her text has been distinguished. For example, a contributor will write "Please see my response in bold." This indication of how contributed text is distinguished from surrounding text is referred to herein as a distinguishing descriptor. The tool generates data that associates the distinguished text with an identity of that particular contributor using the distinguishing descriptor. The tool can then leverage the generated data and augment the document or augment a rendering of the document to explicitly indicate contributors of different text.

Figure 1A:
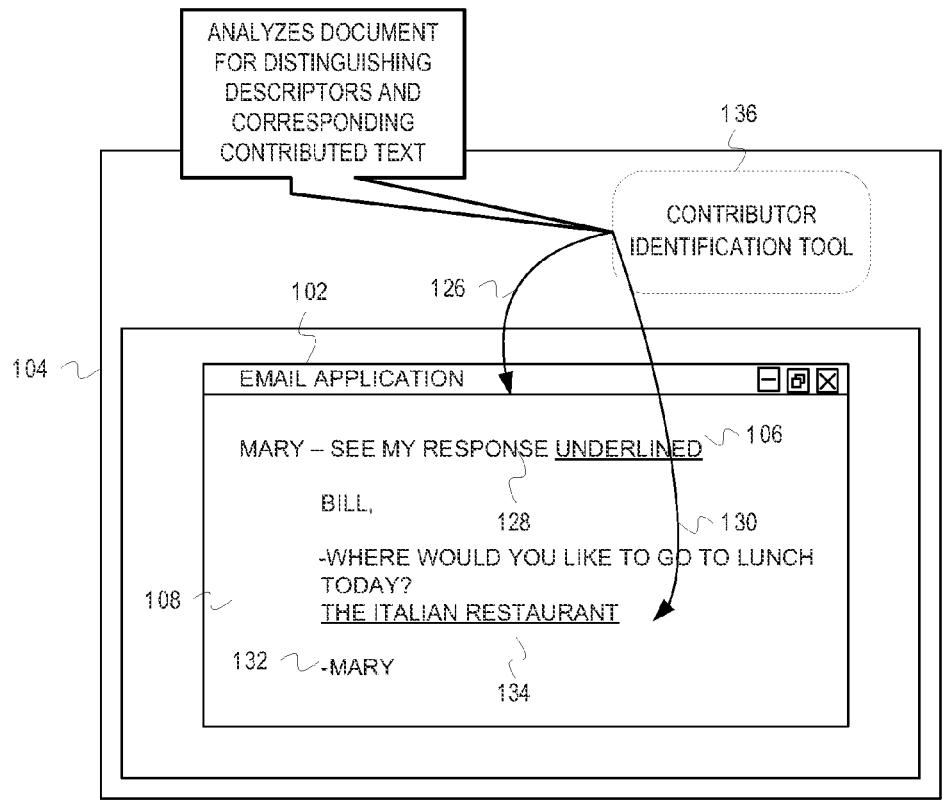
FIG. 1A depicts a contributor identification tool parsing a document for distinguishing descriptors and corresponding contributed text.

FIG. 1A depicts a contributor identification tool parsing a document for distinguishing descriptors and corresponding contributed text. As depicted in FIG. 1A, a display device 104 is presenting an email application 102. The email application 102 presents an email message 108 from Bill to Mary. The email message 108 contains text 106 written by Bill stating "Mary—See my response underlined." The email message 108 also contains text 132 from a previous email from Mary to Bill, asking Bill where he would like to eat lunch today and contributed text 134 inserted by Bill that reads "The Italian restaurant." The contributor identification tool 136 is parsing the text of the email message 108 for distinguishing descriptors and contributed text, as indicated by arrows 126 and 130. First, the contributor identification tool 136 determines that the email message 108 (specifically, Bill's text 106) includes a distinguishing descriptor 128 (i.e., "See my response underlined"). After determining that the email message 108 includes a distinguishing descriptor 128, the contributor identification tool parses the document for contributed text. The contributor identification tool determines that contributed text 134 exists in the email message 108.

Figure 1B:
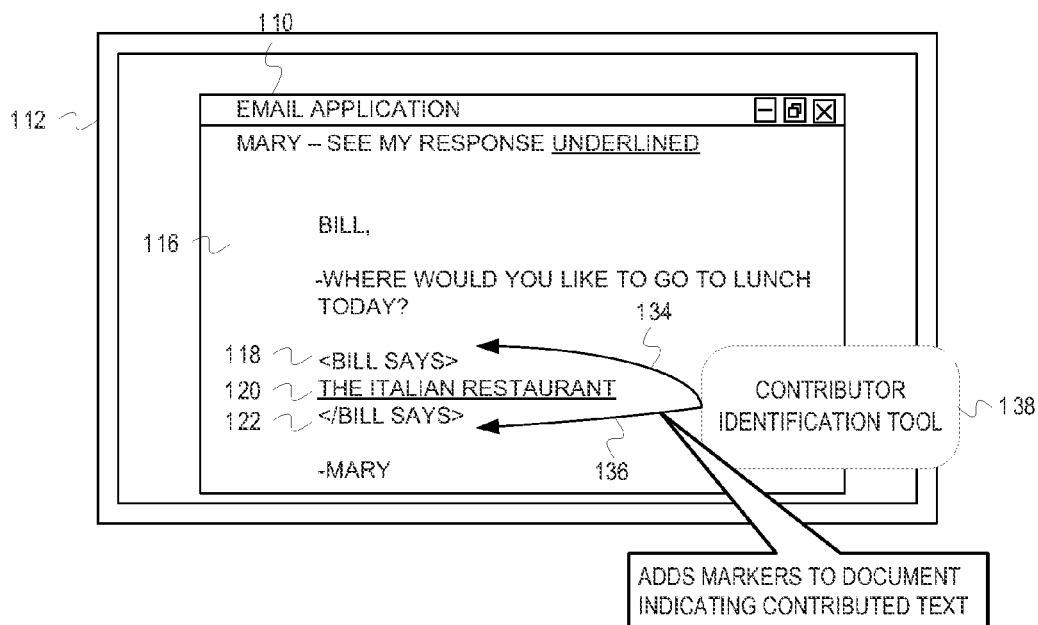
FIG. 1B depicts a contributor identification tool adding markers to a document to indicate contributed text and the contributor of the contributed text.

FIG. 1B depicts a contributor identification tool adding markers to a document to indicate contributed text and the contributor of the contributed text. FIG. 1B contains the same email message 116 as FIG. 1A. FIG. 1B however includes markers 118 and 122 added by the contributor identification tool 138, as indicated by arrows 134 and 136. The first marker 118 indicates the beginning of Bill's contributed text 120. The second marker 122 indicates the end of Bill's contributed text 120. These markers are not added when a contributor inserts comments. Rather, these markers are added by the reader's system after the reader has received the document. These markers allow the reader to more easily determine the contributor of the added comments.

Figure 2:
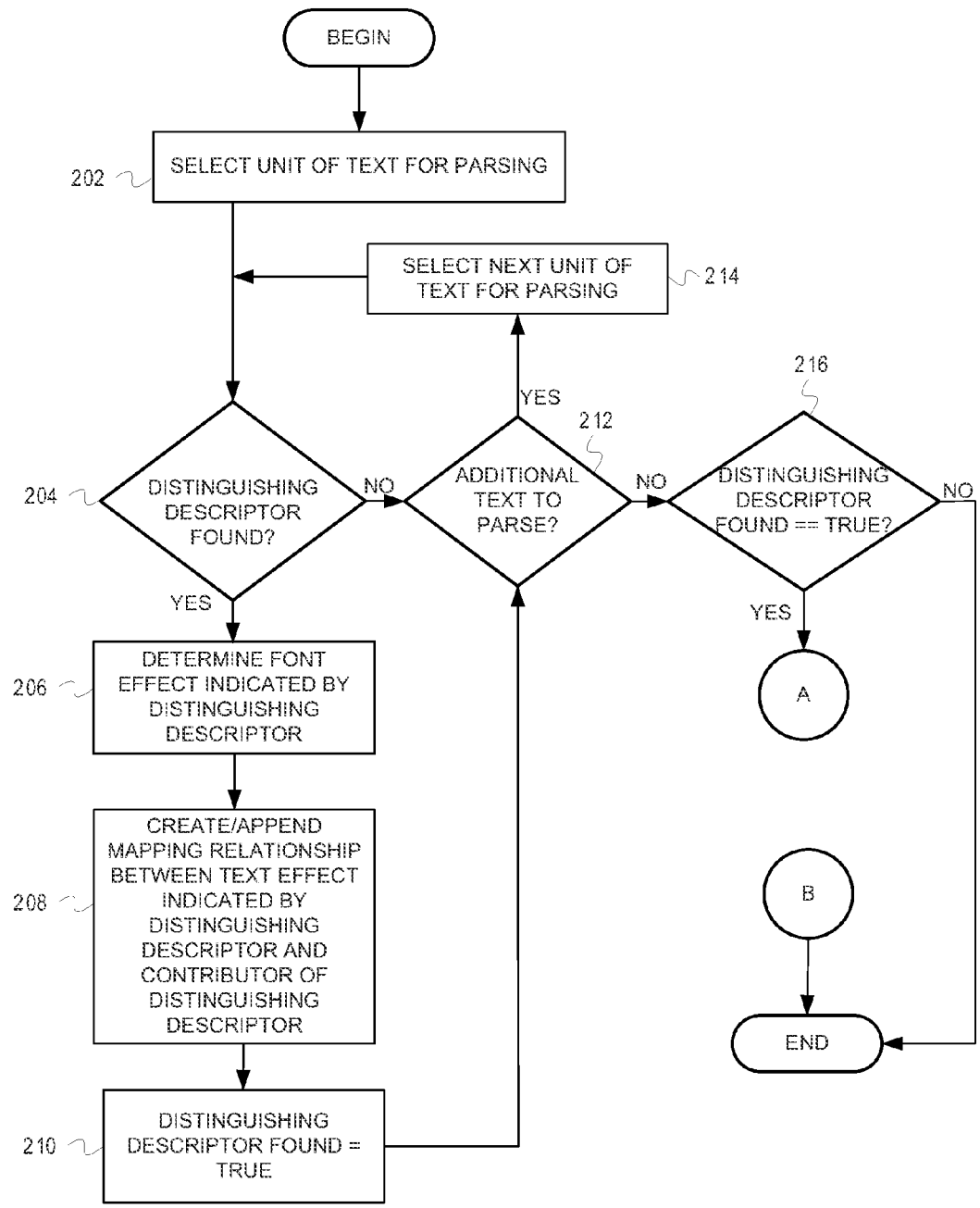
FIGS. 2 and 3 are flow diagrams illustrating example operations for adding textual markers to a document to indicate the contributor of content.
Figure 3:
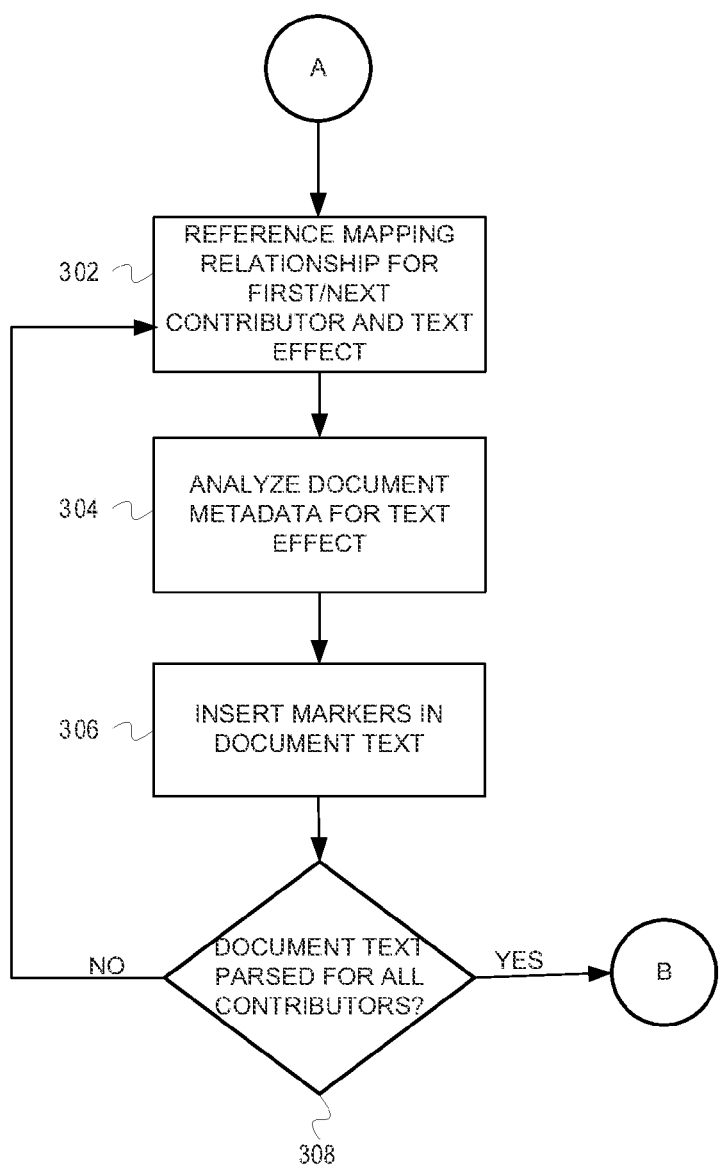

FIGS. 2 and 3 are flow diagrams illustrating example operations for adding textual markers to a document to indicate the contributor of content. The flow begins at block 202.

At block 202, a unit of text is selected for parsing. Embodiments can parse a document at different granularities. For example, a tool can parse a document at granularities of a single word, n word phrases, lines, etc. Also, a tool can begin parsing at particular locations within a document and stop parsing at particular locations of a document. For instance, a tool can be configured to parse an e-mail between the e-mail header and embedded e-mail headers from previous messages. As another example, a tool can begin parsing after a title page of a document and stop at a specified section heading. The flow continues at decision diamond 204.

At decision diamond 204, it is determined whether the selected unit of text includes any distinguishing descriptors. For example, a received e-mail includes content inserted by a user who prefaced his/her insertion with "see my comments in red." A tool parses the e-mail to determine whether the e-mail includes a word or phrase that matches or is similar to a distinguishing descriptor in a database of distinguishing descriptors. For instance, the database includes the distinguishing descriptors "comments in red," "text underlined," "response in bold," etc. The tool searches the e-mail for any one of the distinguishing descriptors. A variety of techniques can be used for the analysis. For example, a tool can search for exact matches of phrases with string comparisons; search overlapping spans of multiple words to determine whether a document includes a distinguishing descriptor; can compare hashes of phrases against hashes of distinguishing descriptors; etc. In some embodiments, the database of phrases may contain partial phrases and a variable. For example, the database may contain the partial phrase "my answers below <variable>," where the variable represents an indication of the text effect of the inserted content. Additionally, a second database containing different text effects can be referenced to determine if the word or words at the "<variable>" location indicate a text effect. Alternatively, key words can be searched for, such as "see," "comment," "response," etc. Additionally, key words that indicate a text effect, such as "red," "bold," "italics," etc. can be searched for. If a key word is located, text within a configured proximity to the key word (e.g., proximity defined in terms of number of words, number of lines, etc.) can then be parsed to determine if a key phrase is present. The key words and/or phrases can be learned and added to the database, based on previous usage, in addition to those that are pre-defined/configured. Referring back to the previous example, the tool determines that the e-mail includes the distinguishing descriptor "comments in red." If the current text being parsed is not a distinguishing descriptor, the flow continues at block 212. If the current text being parsed is a distinguishing descriptor (e.g., "see my comments underlined"), the flow continues at block 206.

At block 206, the distinguishing text effect indicated by the distinguishing descriptor is determined. In some embodiments, the distinguishing descriptor will implicitly indicate the text effect associated with the distinguishing descriptor. For example, the distinguishing descriptor may state "see my response below," where all, or a portion, of the distinguishing descriptor is written in red font. In one example, the metadata (or other information) associated with the red font is processed, indicating that the text has a red text effect. In other embodiments, the distinguishing descriptor will explicitly indicate the text effect associated with the distinguishing descriptor. For example, the distinguishing descriptor may state "see my response in red." In such embodiments, a database containing words or phrases associated with varying text effects is referenced. For example, when the word "red" is processed, it is matched to the word "red" in the database and an indication that the word "red" is associated with text having metadata indicating that the text has a red text effect. The flow continues at block 208.

At block 208, a mapping relationship between the text effect indicated by the distinguishing descriptor and the contributor of the distinguishing descriptor is created. In other words, an association is made between the text effect indicated by the distinguishing descriptor and the contributor of the distinguishing descriptor. For example, two separate contributors, Contributor A and Contributor B, both include inserted content in an email. Contributor A includes in the email "see my comments in red," and Contributor B includes in the email "see my response in blue." As previously discussed, the email is analyzed and it is determined that Contributor A and Contributor B have included inserted content, as indicated by the distinguishing descriptors (i.e., "see my comments in red" and "see my response in blue"). Next, the text effects indicated by the distinguishing descriptors are associated with their respective contributors. In other words, text having a red text effect is associated with Contributor A and text having a blue text effect is associated with Contributor B. In some embodiments, a table or other data structure is created containing an indication of each contributor and the text effect of the text used for their inserted content. For example (using the two-contributor example discussed above), a table having two columns is constructed. The first column will include "Contributor A" and "Contributor B." The second column will include (in the appropriate rows) and indication of each contributors' text effect (i.e., red font and blue font). The flow continues at block 210.

At Hock 210, a check value is set to indicate that a distinguishing descriptor has been found in the document. In some embodiments, at the beginning of the text parsing process, a check value is set to "0" or "false." This "false" check value indicates that no distinguishing descriptors have been found in the document. When a distinguishing descriptor is found, this check value is set to "1" or "true," indicating that the document contains distinguishing descriptors. The flow continues at decision diamond 212.

At decision diamond 212, it is determined whether there is additional text to parse. If there is additional text to parse, the flow proceeds to block 214 to continue the parsing process. In some embodiments, portions of the text in the document may not be parsed. For example, headers, timestamp information, etc. may not be parsed. If all of the document text has been parsed, the flow continues at decision diamond 216.

At decision diamond 216, the check value is analyzed. If the check value does not indicate that a distinguishing descriptor was found in the document (e.g., the check value equals "0" or "false") the flow ends. If the check value indicates that a distinguishing descriptor was found in the document (e.g., the check value equals "1" or "true"), the flow continues at block 302.

At block 302, the mapping relationship is referenced for the first/next contributor and their associated text effect. For example, if Contributor A inserted comments in the document using red text, the mapping relationship will be referenced to determine that red text is attributable to Contributor A. The flow continues at block 304.

At block 304, the document metadata is analyzed for text having the text effect determined at block 302. For example, the document metadata will be analyzed for an indication of text having a red text effect. In some embodiments, upon the occurrence of inserted content in the document, the location of the inserted content is added to the mapping relationship. For example, a third column including an indication of the location of the inserted content associated with each contributor is added to the table. The flow continues at block 306.

At block 306, markers are inserted in the document to indicate the presence of inserted content and its contributor. The makers can be any suitable indication of the presence of inserted content and/or its contributor. For example, the markers can be text such as "Bill states that," or simply the addition of the word "Bill" before the inserted content. In some embodiments, markers are inserted only at the beginning of the inserted content. In other embodiments, markers are inserted at the beginning and end of the inserted content. The flow continues at decision diamond 308.

At decision diamond 308, if the document has been analyzed for all inserted content by each contributor, the flow ends. For example, if a document has two contributors (Contributor A and Contributor B) each using a unique text effect, if the document has been analyzed for content inserted by both Contributor A and Contributor B, the flow ends. If the document has not been analyzed for content inserted by each contributor, the flow continues at block 302. For example, if a document has two contributors (Contributor A and Contributor B) each using a unique text effect, if the document has only been analyzed for inserted content attributable to Contributor A, the flow continues at block 302, where the document is analyzed for inserted content attributable to Contributor B.

Figure 4:
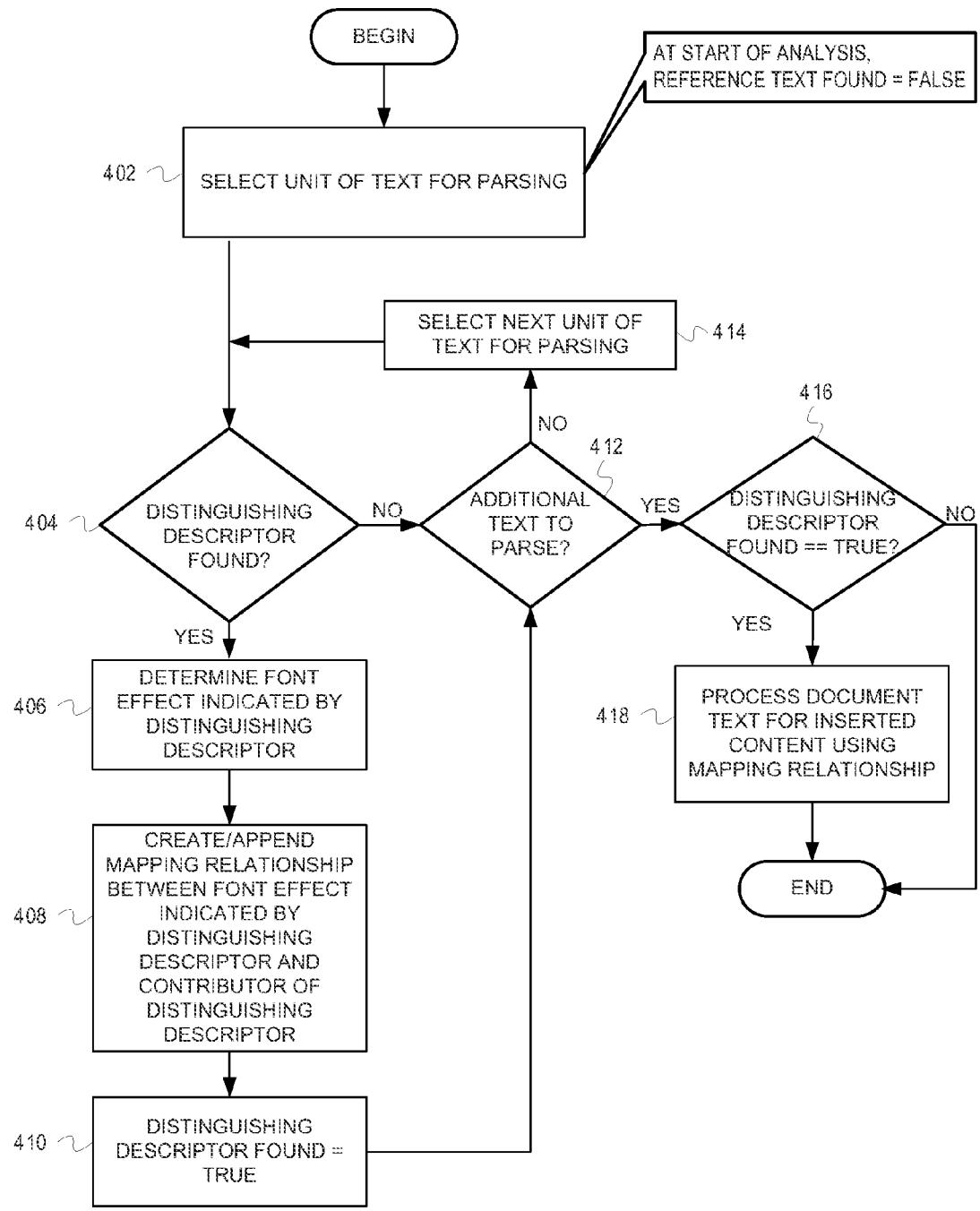
FIG. 4 is a flow diagram illustrating example operations for determining comments added to a document and their respective contributors.

While FIGS. 2 and 3 describes embodiments in which a visual indication of the presence of a comment and its contributor is added to the document text, FIG. 4 describes embodiments in which a non-visual indication of the presence of inserted content and its contributor is provided.

FIG. 4 is a flow diagram illustrating example operations for determining content added to a document and the content's respective contributor. The flow begins at block 402.

At block 402, a unit of text is selected for parsing. Embodiments can parse a document at different granularities. For example, a tool can parse a document at granularities of a single word, n word phrases, lines, etc. Also, a tool can begin parsing at particular locations within a document and stop parsing at particular locations of a document. For instance, a tool can be configured to parse an e-mail between the e-mail header and embedded e-mail headers from previous messages. As another example, a tool can begin parsing after a title page of a document and stop at a specified section heading. The flow continues at decision diamond 404.

At decision diamond 404, it is determined whether the selected unit of text includes any distinguishing descriptors. For example, a received e-mail includes content inserted by a user who prefaced his/her insertion with "see my comments in red." A tool parses the e-mail to determine whether the e-mail includes a word or phrase that matches or is similar to a distinguishing descriptor in a database of distinguishing descriptors. For instance, the database includes the distinguishing descriptors "comments in red," "text underlined," "response in bold," etc. The tool searches the e-mail for any one of the distinguishing descriptors. A variety of techniques can be used for the analysis. For example, a tool can search for exact matches of phrases with string comparisons; search overlapping spans of multiple words to determine whether a document includes a distinguishing descriptor; can compare hashes of phrases against hashes of distinguishing descriptors; etc. In some embodiments, the database of phrases may contain partial phrases and a variable. For example, the database may contain the partial phrase "my answers below <variable>," where the variable represents an indication of the text effect of the inserted content. Additionally, a second database containing different text effects can be referenced to determine if the word or words at the "<variable>" location indicate a text effect. Alternatively, key words can be searched for, such as "see," "comment," "response," etc. Additionally, key words that indicate a text effect, such as "red," "bold," "italics," etc. can be searched for. If a key word is located, text within a configured proximity to the key word (e.g., proximity defined in terms of number of words, number of lines, etc.) can then be parsed to determine if a key phrase is present. The key words and/or phrases can be learned and added to the database, based on previous usage, in addition to those that are pre-defined/configured. Referring back to the previous example, the tool determines that the e-mail includes the distinguishing descriptor "comments in red." If the current text being parsed is not a distinguishing descriptor, the flow continues at block 412. If the current text being parsed is a distinguishing descriptor (e.g., "see my comments underlined"), the flow continues at block 406.

At block 406, the distinguishing text effect indicated by the distinguishing descriptor is determined. In some embodiments, the distinguishing descriptor will implicitly indicate the text effect associated with the distinguishing descriptor. For example, the distinguishing descriptor may state "see my response below," where all, or a portion, of the distinguishing descriptor is written in red font. In one example, the metadata (or other information) associated with the red font is processed, indicating that the text has a red text effect. In other embodiments, the distinguishing descriptor will explicitly indicate the text effect associated with the distinguishing descriptor. For example, the distinguishing descriptor may state "see my response in red." In such embodiments, a database containing words or phrases associated with varying text effects is referenced. For example, when the word "red" is processed, it is matched to the word "red" in the database and an indication that the word "red" is associated with text having metadata indicating that the text has a red text effect. The flow continues at block 408.

At block 408, a mapping relationship between the text effect indicated by the distinguishing descriptor and the contributor of the distinguishing descriptor is created. In other words, an association is made between the text effect indicated by the distinguishing descriptor and the contributor of the distinguishing descriptor. For example, two separate contributors, Contributor A and Contributor B, both include inserted content in an email. Contributor A includes in the email "see my comments in red," and Contributor B includes in the email "see my response in blue." As previously discussed, the email is analyzed and it is determined that Contributor A and Contributor B have included inserted content, as indicated by the distinguishing descriptors (i.e., "see my comments in red" and "see my response in blue"). Next, the text effects indicated by the distinguishing descriptors are associated with their respective contributors. In other words, text having a red text effect is associated with Contributor A and text having a blue text effect is associated with Contributor B. In some embodiments, a table or other data structure is created containing an indication of each contributor and the text effect of the text used for their inserted content. For example (using the two-contributor example discussed above), a table having two columns is constructed. The first column will include "Contributor A" and "Contributor B." The second column will include (in the appropriate rows) and indication of each contributors' text effect (i.e., red font and blue font). The flow continues at block 410.

At block 410, a check value is set to indicate that a distinguishing descriptor has been found in the document. In some embodiments, at the beginning of the text parsing process, a check value is set to "0" or "false." This "false" check value indicates that no distinguishing descriptors have been found in the document. When a distinguishing descriptor is found, this check value is set to "1" or "true," indicating that the document contains distinguishing descriptors. The flow continues at decision diamond 2412.

At decision diamond 412, it is determined whether there is additional text to parse. If there is additional text to parse, the flow proceeds to block 414 to continue the parsing process. In some embodiments, portions of the text in the document may not be parsed. For example, headers, timestamp information, etc. may not be parsed. If all of the document text has been parsed, the flow continues at decision diamond 416.

At decision diamond 416, the check value is analyzed. If the check value does not indicate that a distinguishing descriptor was found in the document (e.g., the check value equals "0" or "false") the flow ends. If the check value indicates that a distinguishing descriptor was found in the document (e.g., the check value equals "1" or "true"), the flow continues at block 418.

At block 418, the document is processed using the mapping relationship. In some embodiments, the contributor identification tool is used in concert with a screen reading apparatus for the visually impaired. For example, as the screen reading apparatus dictates the document, the screen reading apparatus interacts with the contributor identification tool. In some embodiments, the screen reading apparatus analyzes the text while progressing through the document. For example, the screen reading apparatus analyzes the metadata of the document text as it progresses. In such embodiments, the screen reading apparatus will determine, by analyzing the metadata, that the text effect of the text to be dictated has changed. The screen reading apparatus will reference the mapping relationship to determine if the new text effect is associated with a distinguishing descriptor, and thus, a contributor. If the new text effect is associated with a distinguishing descriptor, it will indicate that the text having the new text effect is inserted content added by a specific contributor. Consequently, the screen reading apparatus will provide an indication that the text is inserted content added by the specific contributor. For example, the screen reading apparatus will dictate the phrase "Contributor A states," prior to dictating the inserted content attributable to Contributor A. In other embodiments, the screen reading apparatus does not analyze the metadata of the document text. Instead, the screen reading apparatus will be alerted to the presence of inserted content based on its location within the text. For example, the mapping relationship can include the text effect associated with a particular contributor, an indication of the contributor, and the location of the contributor's inserted content. As the screen reading apparatus progress through the document and reaches the location of inserted content, the screen reading apparatus will provide an indication that the text is inserted content added by the contributor.

Although examples refer to parsing the document for inserted content as a separate action from analyzing the document for distinguishing descriptors, in some embodiments there is only one analysis. In other words, the document is parsed for inserted content and distinguishing descriptors simultaneously. For example, the document can be parsed for keywords or phrases as well as text having metadata indicating a text effect different than that of other text in the document or associated with distinguishing descriptors. In some embodiments, when the presence of inserted content is detected, the location of the inserted content can be logged in a table. Then, after the analysis is complete, the table can be referenced and markers can be inserted in the document to indicate the presence of the inserted content. In other embodiments, when the presence of inserted content is detected, at the time of detection, markers can be inserted to indicate the presence of the inserted content.

Although examples refer to inserted content being written in font having a text effect that differs from other font in other portions of the document, in some embodiments inserted content may be indicated by specific marks or delimiters. For example John Smith may include a distinguishing descriptor in the document stating "see my comments prefaced by 'JS.'" In such embodiments, the contributor identification tool would look for the letters "JS" in the document to indicate a content inserted by John Smith.

Although examples refer to distinguishing descriptors indicating a text effect either implicitly or explicitly, in some embodiments neither the distinguishing descriptor nor the inserted content are associated with a unique text effect. For example, a contributor may simply state "see my comments below" in font having a text effect that is the same as the font of the rest of the document. In such embodiments, the contributor identification tool can use punctuation, delimiters, timestamp information, etc. to determine the presence and location of inserted content. In some embodiments, the contributor identification tool can augment the document by presenting the inserted content in a font having a text effect that differs from that used in other portions of the document.

Although examples refer to referencing the mapping relationship for a font effect associated with a particular contributor then analyzing the document metadata for text having that specific text effect, in some embodiments the document text can be parsed word-by-word (character-by-character, sentence-by-sentence, etc.) for font having a text effect that varies from the previous word, then referencing the mapping relationship to see if the varied text effect is associated with a contributor. For example, a document may be written in black font and may contain inserted content in red font from Contributor A. As the contributor identification tool progresses through the document, it may come to a word written in red font. When this occurs, the contributor identification tool will reference the mapping relationship to determine if red font is associated with a contributor. The contributor identification tool will determine that red font is associated with Contributor A. The process will continue throughout the entirety of the document.

Although examples refer simply to parsing document text, in some embodiments the parsing process may be initiated manually or automatically. For example, a user may be required to manually initiate the parsing process the contributor identification process). In other embodiments, the tool can automatically parse a document upon receipt or opening of the document. Additionally, in some embodiments, the tool may only operate only on certain types of documents. For example, the tool may only operate on email messages. In some embodiments, the user can configure the tool to operate on a predefined set of document types.

Figure 5:
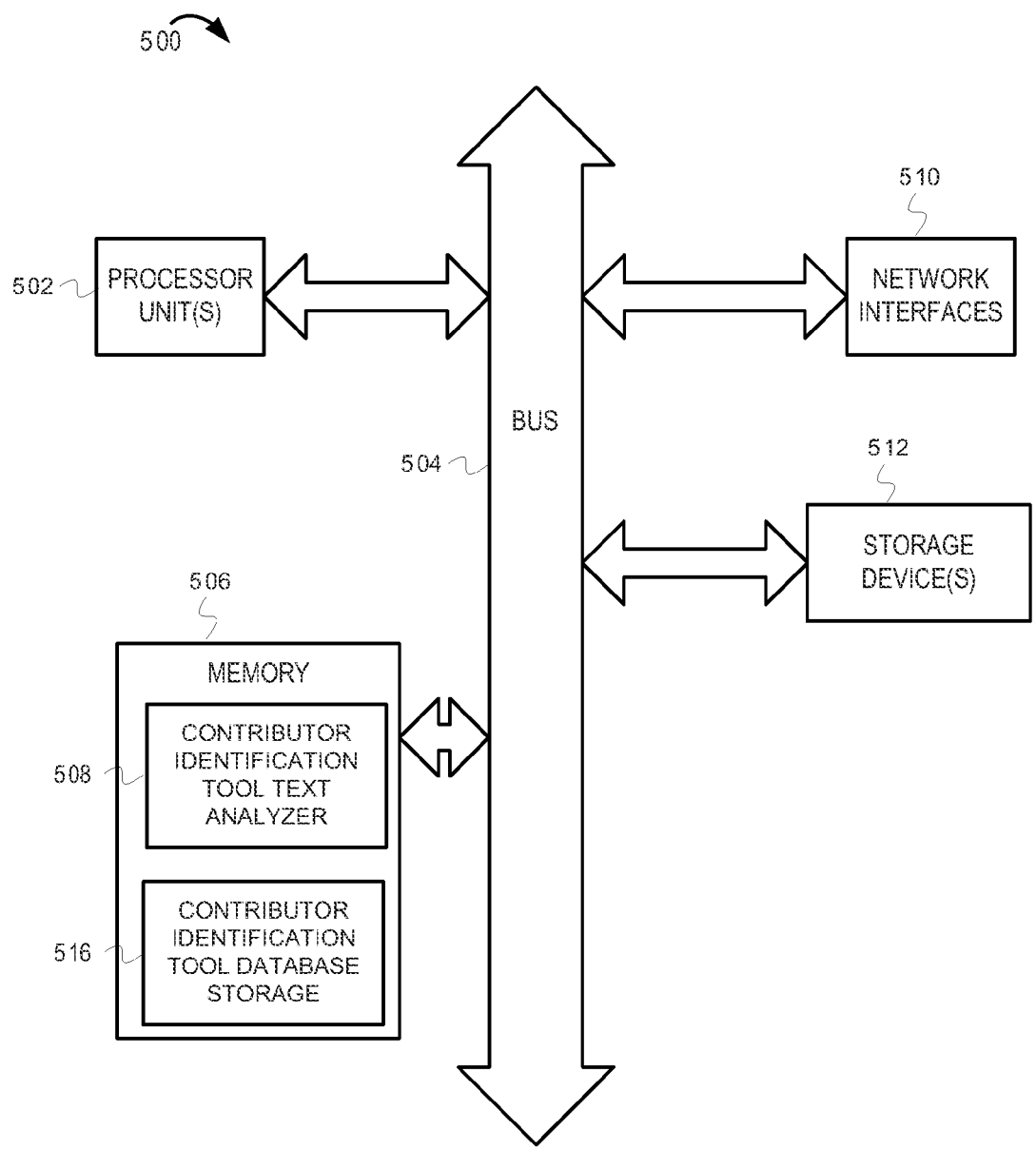
FIG. 5 depicts an example computer system.

FIG. 5 depicts an example computer system. A computer system includes a processor unit 502 (possibly including multiple processors, multiple cores, multiple nodes, and/or implementing multi-threading, etc.). The computer system includes memory 506. The memory 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 504 (e.g., PCI, ISA, PCI-Express, HyperTransport®, InfiniBand®, NuBus, etc.), a network interface 510 (e.g., an ATM interface, an Ethernet interface, a Frame Relay interface, SONET interface, wireless interface, etc.), and a storage device(s) 512 (e.g., optical storage, magnetic storage, etc.). The system memory 506 embodies functionality to implement embodiments described above. Additionally, the system memory 506 includes a contributor identification tool text analyzer 508 and contributor identification tool database storage 516. In some embodiments, the contributor identification tool text analyzer 508 parses the document for distinguishing descriptors and inserted content. In some embodiments, the contributor identification tool database storage creates tables or other data structures to store information relating to the distinguishing descriptors and the inserted content (e.g., contributor, text effect associated with contributor, location, etc.). Any one of these functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the storage device(s) 510, and the network interface 510 are coupled to the bus 504. Although illustrated as being coupled to the bus 504, the memory 506 may be coupled to the processor unit 502.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for identifying content inserted in a document and the contributor associated with the content as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that an electronic document includes a first phrase that is at least similar to a first phrase of a plurality of phrases in a database and a second phrase that is at least similar to a second phrase of a plurality of phrases in the database, wherein the electronic document includes content contributed by a plurality of contributors;
   determining that a first contributor of the plurality of contributors is associated with the first phrase in the electronic document and a second contributor of the plurality of contributors is associated with the second phrase in the electronic document;
   determining that the first phrase identifies a first text effect in the electronic document and that the second phrase identifies a second text effect in the electronic document;
   determining that metadata of the electronic document indicates that first content of the electronic document comprises the first text effect and that second content of the electronic document comprises the second text effect;
   creating a first mapping between the first contributor and the first text effect and a second mapping between the second contributor and the second text effect after determining that the metadata of the electronic document indicates that the first content comprises the first text effect and the second content comprises the second text effect;
   determining a first location in the electronic document of the first content and a second location in the electronic document of the second content;
   associating the first location with the first mapping and the second location with the second mapping;
   supplying the first mapping and the second mapping for presenting of the electronic document; and
   modifying the electronic document to include an indication of the first contributor at the first location and an indication of the second contributor at the second location.

2. The method of claim 1, wherein the supplying the first mapping and the second mapping comprises providing, to an accessibility device, the modified electronic document.

3. The method of claim 1, wherein the supplying the first mapping and the second mapping comprises supplying the first mapping and the second mapping to an accessibility device.

4. The method of claim 1, wherein the supplying the first mapping and the second mapping comprises supplying the first mapping and the second mapping including the first location and the second location.

5. A computer program product, the computer program product comprising:
   a computer readable storage medium having computer usable program code embodied therewith, the computer usable program code comprising a computer usable program code to:
      determine that an electronic document includes a first phrase that is at least similar to a first phrase of a plurality of phrases in a database and a second phrase that is at least similar to a second phrase of a plurality of phrases in the database, wherein the electronic document includes content contributed by a plurality of contributors;
      determine that a first contributor of the plurality of contributors is associated with the first phrase in the electronic document and a second contributor of the plurality of contributors is associated with the second phrase in the electronic document;
      determine that the first phrase identifies a first text effect in the electronic document and that the second phrase identifies a second text effect in the electronic document;
      determine that metadata of the electronic document indicates that first content of the electronic document comprises the first text effect and that second content of the electronic document comprises the second text effect;
      create a first mapping between the first text effect and the first contributor and a second mapping between the second text effect and the second contributor, after a determination that the metadata of the electronic document indicates that the first content comprises the first text effect and the second content comprises the second text effect;
      determine a first location in the electronic document of the first content and a second location in the electronic document of the second content;
      associate the first location with the first mapping and the second location with the second mapping;
      supply the first mapping and the second mapping for presenting of the electronic document; and
      modify the electronic document to include an indication of the first contributor at the first location and an indication of the second contributor at the second location.

6. The computer program product of claim 5, wherein the computer usable program code to supply the first mapping and the second mapping for presenting of the electronic document comprises computer usable program code to supply the first mapping and the second mapping, including the modified electronic document.

7. The computer program product of claim 5, wherein the computer usable program code comprises code to supply the first mapping and the second mapping to an accessibility device.

8. The computer program product of claim 5, wherein the computer usable program code comprises code to supply the first mapping and the second mapping including the first location and the second location.

9. An apparatus comprising:
  a processor; and
  a computer readable storage medium having computer usable program code embodied therewith, the computer usable program code executable by the processor to cause the apparatus to:
    determine that an electronic document includes a first phrase that is at least similar to a first phrase of a plurality of phrases in a database and a second phrase that is at least similar to a second phrase of a plurality of phrases in the database, wherein the electronic document includes content contributed by a plurality of contributors;
    determine that a first contributor of the plurality of contributors is associated with the first phrase in the electronic document and a second contributor of the plurality of contributors is associated with the second phrase in the electronic document;
    determine that the first phrase identifies a first text effect in the electronic document and that the second phrase identifies a second text effect in the electronic document;
    determine that metadata of the electronic document indicates that first content of the electronic document comprises the first text effect and that second content of the electronic document comprises the second text effect;
    create a first mapping between the first text effect and the first contributor and a second mapping between the second text effect and the second contributor, after a determination that the metadata of the electronic document indicates that the first content comprises the first text effect and the second content comprises the second text effect;
    determine a first location in the electronic document of the first content and a second location in the electronic document of the second content;
    associate the first location with the first mapping and the second location with the second mapping;
    supply the first mapping and the second mapping for presenting of the electronic document; and
    modify the electronic document to include an indication of the first contributor at the first location and an indication of the second contributor at the second location.

10. The apparatus of claim 9, wherein the computer usable program code to supply the first mapping and the second mapping for presenting of the electronic document comprises computer usable program code to supply the first mapping and the second mapping, including the modified electronic document.

11. The apparatus of claim 9, wherein the computer usable program code to supply the first mapping and the second mapping for presenting of the electronic document comprises computer usable program code to supply the first mapping and the second mapping, including the modified electronic document.

\* \* \* \* \*